United States Patent [19]

Lausberg et al.

[11] Patent Number: 4,912,163

[45] Date of Patent: Mar. 27, 1990

[54] THERMOPLASTIC POLYESTER MOLDING MATERIALS HAVING LOW TEMPERATURE IMPACT STRENGTH

[75] Inventors: Dietrich Lausberg, Ludwigshafen; Juergen Vietmeier, Wachenheim; Graham E. McKee, Weinheim; Hans-Georg Braun, Gruenstadt; Peter Hildenbrand, Karlsruhe, all of Fed. Rep. of Germany

[73] Assignee: BASF Aktiengesellschaft, Ludwigshafen, Fed. Rep. of Germany

[21] Appl. No.: 390,290

[22] Filed: Aug. 7, 1989

[30] Foreign Application Priority Data

Aug. 13, 1988 [DE] Fed. Rep. of Germany ....... 3827568

[51] Int. Cl.$^4$ .............................................. C08L 69/00
[52] U.S. Cl. ..................................... 525/67; 525/148; 525/439
[58] Field of Search ......................... 525/67, 148, 439

[56] References Cited

U.S. PATENT DOCUMENTS

| 4,764,555 | 8/1988 | Shigemitsu et al. | 525/67 |
| 4,764,556 | 8/1988 | Lausberg et al. | 525/67 |

FOREIGN PATENT DOCUMENTS

| 135779 | 4/1985 | European Pat. Off. |
| 2343609 | 2/1975 | Fed. Rep. of Germany |

Primary Examiner—Theodore E. Pertilla

Attorney, Agent, or Firm—Oblon, Spivak, McClelland, Maier & Neustadt

[57] ABSTRACT

Thermoplastic polyester molding materials essentially contain
- (A) from 20 to 89% by weight of one or more aliphatic polyesters of an aromatic dicarboxylic acid,
- (B) from 10 to 79% by weight of one or more aromatic polycarbonates and
- (C) from 1 to 40% by weight of an elastomer or of a mixture of elastomers consisting of
  - CA from 5 to 100% by weight of an elastomeric graft polymer composed of
    - CA1 not less than 50% by weight of a grafting base having a glass transition temperature $T_g$ of less than $-20°$ C.,
    - CA2 from 5 to 20% by weight of a first graft shell consisting of a mixture of a $C_1$-$C_8$-alkyl ester of acrylic acid and a vinylaromatic in a weight ratio of from 5:95 to 70:30 and
    - CA3 from 10 to 30% by weight of a second graft shell consisting of one or more polymers having a glass transition temperature $T_g$ above 20° C. and
  - CB from 0 to 95% by weight of an ethylene copolymer composed of CB1 from 40 to 99% by weight of ethylene and CB2 from 1 to 60% by weight of one or more comonomers containing carboxyl groups and/or carboxyl group derivatives, the sum of A to C, CA and CB, CA1 to CA3 and of CB1 and CB2 being 100% by weight in each case.

2 Claims, No Drawings

THERMOPLASTIC POLYESTER MOLDING MATERIALS HAVING LOW TEMPERATURE IMPACT STRENGTH

The present invention relates to thermoplastic polyester molding materials which have low temperature impact strength as well as very good hole impact strength at low temperatures and high heat distortion resistance.

Polymer blends of thermoplastic polyesters and polycarbonate are disclosed in No. DE-A-No. 24 17 002. They have better mechanical properties than the pure polyesters. Attempts have already been made to improve the impact strength of polyester/polycarbonate blends by adding elastomers. According to German Patent No. 2,343,609, suitable modifiers are graft copolymers based on polybutadiene.

No. EP-A-No. 135 779 describes graft copolymers which have a core/shell structure and whose core essentially consists of polybutadiene, whose first shell consists of vinyl monomers, such as styrene or acrylonitrile, and whose second shell consists of (meth)acrylates together with a crosslinking agent.

These rubbers impart good toughness at above 0° C. to molding materials prepared therefrom, but the low temperature toughness and elongation at break are not yet completely satisfactory.

It is an object of the present invention to provide thermoplastic polyester molding materials which have high impact strength and good mechanical properties and at the same time possess good notched impact strength at low temperatures and high elongation at break.

We have found that this object is achieved by thermoplastic polyester molding materials which have low temperature impact strength and essentially contain components (A) from 20 to 89, preferably from 30 to 77, in particular from 35 to 75%, by weight of one or more aliphatic polyesters of an aromatic dicarboxylic acid,
(B) from 10 to 79, preferably from 20 to 67, in particular from 20 to 60%, by weight of one or more aromatic polycarbonates and
(C) from 1 to 40, preferably from 3 to 30, in particular from 5 to 25%, by weight of an elastomer or of a mixture of elastomers consisting of CA from 5 to 100% by weight of CA 30 CB, of an elastomeric graft polymer composed of
CA1 not less than 50% by weight of a grafting base having a glass transition temperature $T_g$ of less than $-20°$ C.,
CA2 from 5 to 20% by weight of a first graft shell consisting of a mixture of a $C_1$–$C_8$-alkyl ester of acrylic acid and a vinylaromatic in a weight ratio of from 5:95 to 70:30 and
CA3 from 10 to 30% by weight of a second graft shell consisting of one or more polymers having a glass transition temperature $T_g > 20°$ C. and CB from 0 to 95% by weight of an ethylene copolymer composed of
(a) from 40 to 99% by weight of ethyl
(b) from 1 to 60% by weight of one or more comonomers containing carboxyl groups and/or carboxyl group derivatives, the sum of A to C being 100% by weight.

The novel thermoplastic polyester molding materials having high impact strength possess good mechanical properties, in particular good notched impact strengths at low temperatures and high elongations at break in combination with high heat distortion resistance and a good natural color.

The polyesters used according to the invention (component A) are known per se. They have chain units which contain an unsubstituted or substituted aromatic ring in the polymer chain. Examples of such substituents of the aromatic ring are halogen, such as chlorine or bromine, and $C_1$–$C_4$-alkyl, such as methyl, ethyl, propyl or butyl.

Suitable polyesters can be prepared, for example, by reacting aromatic dicarboxylic acids, their esters or their ester-forming derivatives with dihydroxy compounds in a conventional manner.

Examples of aromatic dicarboxylic acids are naphthalene dicarboxylic acids, terephthalic acid and isophthalic acid and mixtures of these. Part of the aromatic dicarboxylic acids or their derivatives, preferably not more than 10 mol %, can be replaced with other dicarboxylic acids. Examples of these are aliphatic or cycloaliphatic dicarboxylic acids, such as acidic acid, azelaic acid, sebacic acid and cyclohexanedicarboxylic acid and mixtures of these.

Preferably used dihydroxy compounds are glycols of 2 to 6 carbon atoms, in particular ethylene glycol, butane-1,4-diol, but-2-ene-1,4-diol, hexane-1,6-diol, hexane-1,4-diol, cyclohexane-1,4-diol, 1,4-di-(hydroxymethyl)-cyclohexane, 2,2-di-(4'-hydroxyphenyl)-propane and neopentylglycol and mixtures of these.

Preferred polyesters are polyalkylene terephthalates which are derived from alkanediols of 2 to 6 carbon atoms. Polyethylene terephthalate and polybutylene terephthalate are particularly preferred.

The relative viscosity of the polyesters is in general from 1.2 to 1.8, measured in 0.5% strength by weight solution in a phenol/o-dichlorobenzene mixture (weight ratio 3:2) at 25° C.

The aromatic polycarbonates used according to the invention (component B) are likewise known per se. They are obtainable, for example, by interfacial polycondensation using the process according to German Patent No. 1,300,266, or by transesterification of diphenyl carbonate with bisphenol A by the process of German Laid Open Application No. DOS 1,495,730. Up to 30 mol % of bisphenol A may be replaced with other aromatic bishydroxy compounds, in particular 2,2-bis-(4-hydroxyphenyl)pentane, 2,6-dihydroxynaphthalene, bis-(4-hydroxyphenyl) sulfone, bis-(4-hydroxyphenyl) ether, bis-(4-hydroxyphenyl) sulfide, bis-(4-hydroxyphenyl)-methane, 1,1-bis(4-hydroxyphenyl)-ethane or 4,4'-dihydroxydiphenyl.

Polycarbonates suitable for the purpose according to the invention generally have a relative viscosity (measured at 25° C. in a 0.5% strength by weight methylene chloride solution) of, preferably, from 1.2 to 1.5, in particular from 1.28 to 1.40.

The novel molding materials contain, as component C, from 1 to 40, preferably from 3 to 30, in particular from 5 to 25%, by weight of an elastomer or of a mixture of elastomers consisting of from 5 to 100, preferably from 20 to 90, in particular from 30 to 80%, by weight of an elastomeric graft polymer of (CA1) not less than 50, preferably from 50 to 80% by weight of a grafting base having a glass transition temperature $T_g$ of below $-20°$ C., (CA2) from 5 to 20, preferably from 7 to 18, in particular from 8 to 15%, by weight of a first graft shell consisting of a mixture of $C_1$-$C_8$-alkyl esters of acrylic acid and a vinyl aromatic in a weight ratio of from 5:95 to 70:30 and CA3) from 10 to 30, preferably from 12 to 28, in particular from 14 to 25%, by weight of a second graft shell of one or more polymers having a glass transition temperature $T_g$ of more than 20° C.

The glass transition temperature of the graft polymers CA is preferably from $-150°$ to $-21°$ C.

Examples of such graft polymers are systems based on polybutadiene or systems based on esters of acrylic acid and/or methacrylic acid. Graft copolymers which have a core based on polybutadiene are particularly suitable.

The graft polymers are preferably prepared in a known manner by emulsion polymerization, as described in, for example, Houben-Weyl, Methoden der organischen Chemie, Volume XIV/1, 1961, pages 396–399.

Where acrylate or methacrylate rubbers are used, up to 40% by weight of further comonomers may be present in addition to (meth)acrylates. The $C_1$-$C_8$-alkyl esters of acrylic acid or methacrylic acid and their halogenated derivatives and also aromatic acrylates and mixtures of these are preferred as esters of (meth)acrylic acid. Examples of comonomers in the grafting base are acrylonitrile, methacrylonitrile, styrene, α-methylstyrene, acrylamides, methacrylamides and vinyl $C_1$-$C_8$-alkyl ethers.

The grafting base may be uncrosslinked or partly or completely crosslinked. Crosslinking is achieved by copolymerization of, preferably, from 0.02 to 5, in particular from 0.05 to 2%, by weight of a crosslinking monomer having more than one double bond. Suitable crosslinking monomers are described in, for example, No. DE-A-27 26 256, No. DE-A-24 44 584 and No. EP-A-50 265.

Preferred crosslinking monomers are triallyl cyanurate, triallyl isocyanurate, triacryloylhexahydro-s-triazine and trialkylbenzenes as well as dihydrodicyclopentadienyl acrylate.

If the monomers used have more than 2 polymerizable double bonds, it is advantageous to limit their amount to not more than 1% by weight, based on the grafting base.

Preferred grafting bases are polymers based on butadiene.

In addition to butadiene, it is also possible to incorporate up to 20% by weight of other monomers in the grafting base. Examples of these are styrene, acrylonitrile, esters of acrylic or methacrylic acid with $C_1$-$C_8$-alkanols, and dienes, such as isoprene, chloroprene or other vinyl compounds which are copolymerizable with butadiene. The grafting base is thus advantageously composed of not less than 80% by weight of polybutadiene units.

Particularly preferred grafting bases are emulsion polymers having a gel content of not less than 50, in particular not less than 60%, by weight (determined in dimethylformamide at 25° C. according to M. Hoffmann, H. Krömer, R. Kuhn, Polymeranalytik, Georg-Thieme-Verlag, Stuttgart, 1977).

A first shell which, in addition to a vinyl aromatic monomer, such as styrene, α-methyl styrene or p-methyl styrene, also contains a $C_1$-$C_8$-alkyl ester of acrylic acid in a ratio of from 95:5 to 30:70, preferably from 92:8 to 50:50, particularly preferably from 90:10 to 60:40, is grafted onto this grafting base.

Preferred $C_1$-$C_8$-alkyl esters of acrylic acid are ethyl, n-butyl and 2-ethylhexyl acrylate, particularly preferably ethyl acrylate.

This first shell can be crosslinked with conventional crosslinking agents. The amount of the first shell is from 5 to 20, preferably from 7 to 18, particularly preferably from 8 to 15%, by weight, based on CA.

A second shell consisting of one or more polymers having a glass transition temperature $T_g > 20°$ C. is grafted onto this first graft shell.

Preferred monomers for the synthesis of the graft shell are mixtures of styrene and acrylonitrile in a weight ratio of from 3.5:0.5 to 2.5:1.5, as well as methyl (meth)acrylate and mixtures thereof. Small amounts, for example not more than 30% by weight, based on the sum of the graft monomers, of other monomers may be incorporated in the graft shell, such as acrylates of $C_1$-$C_{10}$-alkanols, methacrylates of $C_2$-$C_{10}$-alkanols and vinylderivatives having reactive groups, such as allyl (meth)acrylate, maleic anhydride, itaconic acid or glycidyl methacrylate.

The particles of the graft polymer advantageously have a median diameter of 0.05 to 0.6 μm, determined by ultracentrifuging.

In every case, the stated median particle sizes are the weight average of the particle size as determined using an analytical ultracentrifuge, by the method of W. Scholtan and M. Lange, Kolloid-Z. and Z.-Polymere, 250 (1972), 782–796. The ultracentrifuge measurement gives the integral mass distribution of the particle diameter of a sample. From this it is possible to determine the percentage by weight of the particles which have a diameter equal to or smaller than a certain size. The median particle diameter, which is also referred to as the $d_{50}$ value of the integral mass distribution, is defined as the particle diameter at which 50% by weight of the particles have a diameter equal to or smaller than the diameter which corresponds to the $d_{50}$ value.

Preferred copolymers CB are elastomeric ethylene copolymers with (meth)acrylates. Ethylene/(meth)acrylate terpolymers with monomers carrying epoxy groups are particularly preferred.

Preferred monomers carrying epoxy groups are ethers of the general formula

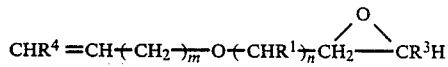

where m is an integer of from 0 to 20, n is an integer of from 1 to 10 and $R^1$, $R^2$, $R^3$ and $R^4$ are each hydrogen or alkyl of 1 to 6 carbon atoms, preferably methyl, ethyl or n-propyl.

Preferably, m is 0 or 1, n is 1 and $R^1$, $R^2$ and $R^3$ are each H, for example alkyl glycidyl ether or vinyl glycidyl ether.

Further monomers carrying epoxy groups are olefins carrying epoxy groups, of the general formula

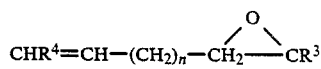

where m, $R^2$, $R^3$ and $R^4$ have the same meaning as above and m is preferably from 0 to 5, $R^4$ is preferably H or methyl and $R^2$ and $R^3$ are each preferably H, methyl or ethyl.

Epoxy-carrying esters of acrylic acid or methacrylic acid are particularly preferred. Glycidyl acrylate and glycidyl methacrylate have become particularly important industrially.

Preferred olefin polymers contain
(a) from 50 to 99% by weight of an olefin, preferably ethylene,
(b) m 1 to 50% by weight of glycidyl acrylate and/or glycidyl methacrylate and, if required,
(c) from 0 to 49% by weight of one or more other copolymerizable monomers.

The glass transition temperature of the olefin polymer is preferably below 0° C., particularly preferably below −20° C. Preferred copolymerizable monomers are (meth)acrylates, vinyl esters, vinyl ethers and methylbutenol. Examples are methyl (meth)acrylate, ethyl (meth)acrylate, propyl (meth)acrylates, butyl (meth)acrylates, particularly preferably n-butyl acrylate and 2-ethylhexyl acrylate.

Particularly preferred olefin polymers contain
(a) from 50 to 98% by weight of ethylene,
(b) from 1 to 40% by weight of glycidyl (meth)acrylate and
(c) from 1 to 45% by weight of n-butyl acrylate and/or 2-ethylhexyl acrylate, and olefin polymers of
(a) from 60 to 95% by weight of ethylene,
(b) from 3 to 20% by weight of glycidyl (meth)acrylate and
(c) from 10 to 35% by weight of n-butyl acrylate and/or 2-ethylhexyl acrylate have proven particularly useful.

The amount of the polymers CB in component C is from 0 to 95, preferably from 10 to 80, in particular from 20 to 70%, by weight, based on the total weight of component C.

The olefin polymers can be polymerized by any methods, such as random copolymerization, block copolymerization and graft copolymerization.

Random copolymerization under high pressure and at elevated temperatures is preferred. The polymers CB generally have a high molecular weight and a melt flow index (MFI 190/2.16, DIN 53,735) of from 1 to 80.

In addition to the essential components (A) to (C), the novel molding materials may contain conventional additives and processing assistants.

The antioxidants and heat stabilizers which may be added to the thermoplastic materials according to the invention include those which are generally added to polymers, for example halides of metals of group I of the Periodic Table, e.g. sodium halides, potassium halides and lithium halides in combination with copper(I) halides, such as chlorides, bromides or iodides. Other suitable stabilizers are sterically hindered phenols, hydroquinones, various substituted members of this group and combinations thereof, in concentrations of not more than 1% by weight, based on the weight of the mixture.

UV stabilizers which are generally added to polymers can also be used, in amounts of not more than 2.0% by weight, based on the mixture. Examples of UV stabilizers are various substituted resorcinols, salicylates, benzotriazoles, benzophenones and the like.

Suitable lubricants and mold release agents, which may be added to the thermoplastic material in amounts of, for example, not more than 1% by weight, are stearyl alcohol and fatty acid esters, such as stearic esters. It is also possible to add organic dyes, such as nigrosine, and pigments, e.g. titanium dioxide, cadmium sulfide, cadmium sulfide selenide, phthalocyanine, ultramarine blue or carbon black.

The novel molding materials may also contain fibrous and powdered fillers and reinforcing agents, such as carbon fibers, glass fibers, amorphous silica, asbestos, calcium silicate, calcium metasilicate, aluminum silicate, magnesium carbonate, kaolin, chalk, powdered quartz, mica or feldspar, in amounts of not more than 50% by weight, based on the molding material. Nucleating agents, such as talc, calcium fluoride, sodium phenylphosphinate, alumina or finely divided polytetrafluoroethylene, can also be used, in amounts of, for example, not more than 5% by weight, based on the material. Plasticizers, such as dioctyl phthalate, dibenzyl phthalate, butylbenzyl phthalate, hydrocarbon oils, N-(n-butyl)-benzenesulfonamide and sand p-tolueneethylsulfonamide, are advantageously added in amounts of not more than about 20% by weight, based on the molding material. Colorants, such as dyes and pigments, can be added in amounts of not more than about 5% by weight, based on the molding material.

The molding materials according to the invention are prepared, for example, by mixing the components A to C in a conventional mixing apparatus, such as a screw extruder, a Brabender mill or a Banbury mill, and extruding the mixture.

In a preferred procedure, the polyester, the polycarbonate, the graft rubber and, if required, ethylene copolymers and additives are mixed and the mixture is extruded in a twin-screw extruder.

The novel molding materials are suitable for the production of high-strength heat-resistant moldings having high impact strength, for all types of industrial applications, by the injection molding, extrusion and extrusion blow molding processes.

EXAMPLES

First, polybutylene terephthalate (PBT) was thoroughly mixed with a polycarbonate (PC) and the impact modifiers, the mixture was melted in a twin-screw extruder of type ZSK 30 from Werner and Pfleiderer at 250° C., and the melt was homogenized and extruded into a water bath. After granulation and drying, test specimens were molded in an injection molding machine and were tested without further aftertreatment.

The polybutylene terephthalate used had a relative viscosity of 1.60, measured in a 0.5% strength solution in phenol/o-dichlorobenzene (weight ratio 1:1) at 25° C.

The polycarbonate used was based on bisphenol A and had a relative viscosity of 1.36 measured in a 0.5% strength solution in methylene chloride at 25° C.

The following rubbers were used:

In the description of the rubbers, percentages and ratios are always by weight, unless stated otherwise.

Latex 1: An aqueous polybutadiene latex having a $d_{50}$ value of 90 nm and a solids content of 42%

Latex 2: An aqueous n-butyl acrylate latex having a $d_{50}$ value of 350 nm and a solids content of 40%, crosslinked with 0.8% of dihydrodicyclopentadienyl acrylate CA/1 70% of latex 1 grafted in the first stage with styrene/ethyl acrylate in a ratio of 9:1 (10%) and in the second stage with methyl methacrylate/glycidyl methacrylate (MMA/GMA) in a ratio of 19:1 (20%), having a $d_{50}$ of 110 nm and a gel content (in toluene) of 89% by weight CA/2 As for CA/1, but grafted in the first stage with styrene/ethyl acrylate in a ratio of 7:3 (10%), having a $d_{50}$ of 110 nm and a gel content of 90%

CA/3 As for CA/1, but grafted in the first stage with styrene/ethyl acrylate in a weight ratio of 5:5 (10%), having a $d_{50}$ of 110 nm and a gel content of 92%

CA/4 As for CA/1, but grafted in the first stage with styrene/n-butyl acrylate in a ratio of 8:2 and having a $d_{50}$ of 110 nm and a gel content of 90%

CA/5 As for CA/1, but grafted in the first stage with styrene/2-ethylhexyl acrylate in a ratio of 9:1, having a $d_{50}$ of 110 nm and a gel content of 88%

CA/6 Latex 2 grafted in the first stage with styrene-/ethyl acrylate in a ratio of 8:2 (10%) and in the second stage with MMA/GMA in a ratio of 19:1 (20%), having a $d_{50}$ of 410 nm and a gel content of 79%

CA/7 As for CA/6, but grafted in the first stage with styrene/ethyl acrylate/dihydrodicyclopentadienyl acrylate in a ratio of 78:20:2 (10%), having a $d_{50}$ of 400 nm and a gel content of 86%

CA/V1 As for CA/1, but 100% styrene in the first (Comp.) stage (10% by weight) and having a $d_{50}$ of 110 nm and a gel content of 88%

CA/V2 As for CA/6, but 100% styrene in the first (Comp.) stage (10% by weight) and having a $d_{50}$ of 430 nm and a gel content of 78%

CA/V3 Paraloid ® KM 6 53 (Rohm and Haas)
(Comp.) Core: polybutadiene/styrene 9:1 (70%)
1st shell: styrene (10%)
2nd shell: MMA (20%) $d_{50}$ 120 nm, gel content 95%

CB Ethylene terpolymer of ethylene, n-butyl acrylate and glycidyl methacrylate (67:30:3) having an MFI of 10 g/10 min (190° C./2.16 kp).

The composition of the products and the results are shown in Table 1.

TABLE 1

| No. | Component (% by weight) B | A | Graft polymer CA | Ethylene copolymer CB | Notched impact strength (according to DIN 53,453) $a_k$-20° C. [kJ/m$^2$] | $a_k$-40° C. [kS/cm$^2$] | Elongation at break (DIN 53,455) $\epsilon_R$ [%] | Heat distortion resistance Vicat B [%] |
|---|---|---|---|---|---|---|---|---|
| 1 | 50 | 40 | 10 CA/1 | — | 32 | 17 | 160 | 128 |
| 2 | 50 | 40 | 10 CA/2 | — | 30 | 16 | 150 | 127 |
| 3 | 50 | 40 | 10 CA/3 | — | 28 | 14 | 150 | 127 |
| 4 | 50 | 40 | 10 CA/4 | — | 29 | 15 | 150 | 127 |
| 5 | 50 | 40 | 10 CA/5 | — | 31 | 17 | 160 | 126 |
| 6 | 50 | 40 | 10 CA/6 | — | 15 | 7 | 150 | 128 |
| 7 | 50 | 40 | 10 CA/7 | — | 15 | 6 | 160 | 128 |
| 8* | 50 | 40 | 10 CA/V1 | — | 23 | 12 | 100 | 125 |
| 9* | 50 | 40 | 10 CA/V2 | — | 11 | 5 | 110 | 126 |
| 10* | 50 | 40 | 10 CA/V3 | — | 20 | 12 | 120 | 117 |
| 11 | 15 | 65 | 10 CA/1 | 10 | 24. | 15 | 120 | 122 |
| 12 | 15 | 65 | 10 CA/5 | 10 | 23 | 16 | 110 | 121 |
| 13* | 15 | 65 | 10 CA/V1 | 10 | 15 | 10 | 100 | 118 |

We claim:

1. A thermoplastic polyester molding material, essentially containing
   (A) from 20 to 89% by weight of one or more aliphatic polyesters of an aromatic dicarboxylic acid,
   (B) from 10 to 79% by weight of one or more aromatic polycarbonates and
   (C) from 1 to 40% by weight of an elastomer or of a mixture of elastomers consisting of
      CA from 5 to 100% by weight of an elastomeric graft polymer composed of
         CA1 not less than 50% by weight of a grafting base having a glass transition temperature $T_g$ of less than −20° C.,
         CA2 from 5 to 20% by weight of a first graft shell consisting of a mixture of a $C_1$–$C_8$-alkyl ester of acrylic acid and a vinylaromatic in a weight ratio of from 5:95 to 70:30 and
         CA3 from 10 to 30% by weight of a second graft shell consisting of one or more polymers having a glass transition temperature $T_8$ above 20° C. and
      CB from 0 to 95% by weight of an ethylene copolymer composed of
         CB1 from 40 to 99% by weight of ethylene and
         CB2 from 1 to 60% by weight of one or more comonomers containing carboxyl groups, carboxyl group derivatives, or mixtures thereof, the sum of A to C, CA and CB, CA1 to CA3 and of CB1 and CB2 being 100% by weight in each case.

2. A thermoplastic polyester molding material as claimed in claim 1, wherein the grafting base CA/1 has a gel content of not less than 50% by weight.

* * * * *